June 5, 1962 R. KOBLER 3,038,037

RECORDING MACHINE

Filed Jan. 29, 1958

INVENTOR.
RICHARD KOBLER

BY George H. Fritzinger

AGENT

United States Patent Office 3,038,037

Patented June 5, 1962

3,038,037
RECORDING MACHINE

Richard Kobler, West Orange, N.J., assignor to McGraw-Edison Company, Elgin, Ill., a corporation of Delaware Filed Jan. 29, 1958, Ser. No. 712,034
4 Claims. (Cl. 179—100.4)

This invention relates to phonographic recording machines of the type which operate by forming a laterally modulated groove in a moving record, and especially the invention relates to an improvement in the recording heads for such machines. The invention is useful particularly in connection with machines for recording dictation, and is herein described in connection therewith by way or preferred example.

In recording dictation there is encountered a wide range in volume level dependent on the character of the dictator's voice, whether he holds the microphone close to or far from his mouth and whether he speaks at a low or a high level of voice. Over and above these variations there occur extraneous high level signals of both electrical and acoustical origin such as from amplifier or motor hum, accidental striking of the microphone against some object, and so forth. In recording any such high level signal the groove formed in the record medium may be so over-modulated that it cannot be tracked by a reproducer stylus. Moreover, upon recording in a spiral or helical track one groove may be cross-modulated into the next or at least come so close to the next as to give rise to "echo" effects wherein the recording in the next adjacent groove is heard in the background during reproduction of the record, this being especially likely to occur if the recording method is by embossing. Of course, these inter-groove effects can be avoided by recording in a spiral or helical groove having a large pitch—i.e., a large land area between successive groove convolutions—but to do so is wasteful of the record area. Moreover, electrical suppression of the signal volume as by automatic volume control in the audio amplifier does not cope fully with the over-modulation problems because there is an inherent delay in such systems permitting the initial high energy components to be fed through to the recorder.

My invention resides in mechanically limiting the amplitude of vibration of the recorder stylus to a definite magnitude regardless of the level of signal fed into the recorder head, and in so selecting the limit in magnitude and the groove pitch as to enable a recordation of signals of normal volume range with maximum efficiency in utilization of the record area as well as to record abnormally high level signals with minimum distortion. Alternatively, instead of utilizing the invention to record with greater efficiency in utilization of record area I may record with the same recordation density but with a deeper and wider groove to obtain better tracking for the reproducer stylus. In either case, the modulation of the record groove is so limited as to enable faithful tracking thereof by the reproducer stylus. The end result is that the quality of reproduction of such high level signals as would overload the equipment is better than is otherwise feasible.

Particular objects of my invention are therefore to prevent over-modulation of the record groove from any abnormally high level signal fed to the recorder head, to provide an improvement in stylus recording which prevents cross-modulation of grooves as well as echo effects between grooves, and to provide such improvements in stylus recording as permit a maximum density of recordation on the record as well as the recordation at reduced level of abnormally high level signals without appreciable distortion.

A further object is to accomplish the aforestated objectives by very simple means and by making only a small change in existing recorder heads of standard design.

These and other objects and features of my invention will be apparent from the following description and the appendant claims.

In the description of my invention reference is had to the accompanying drawings, of which:

Figures 1, 2:
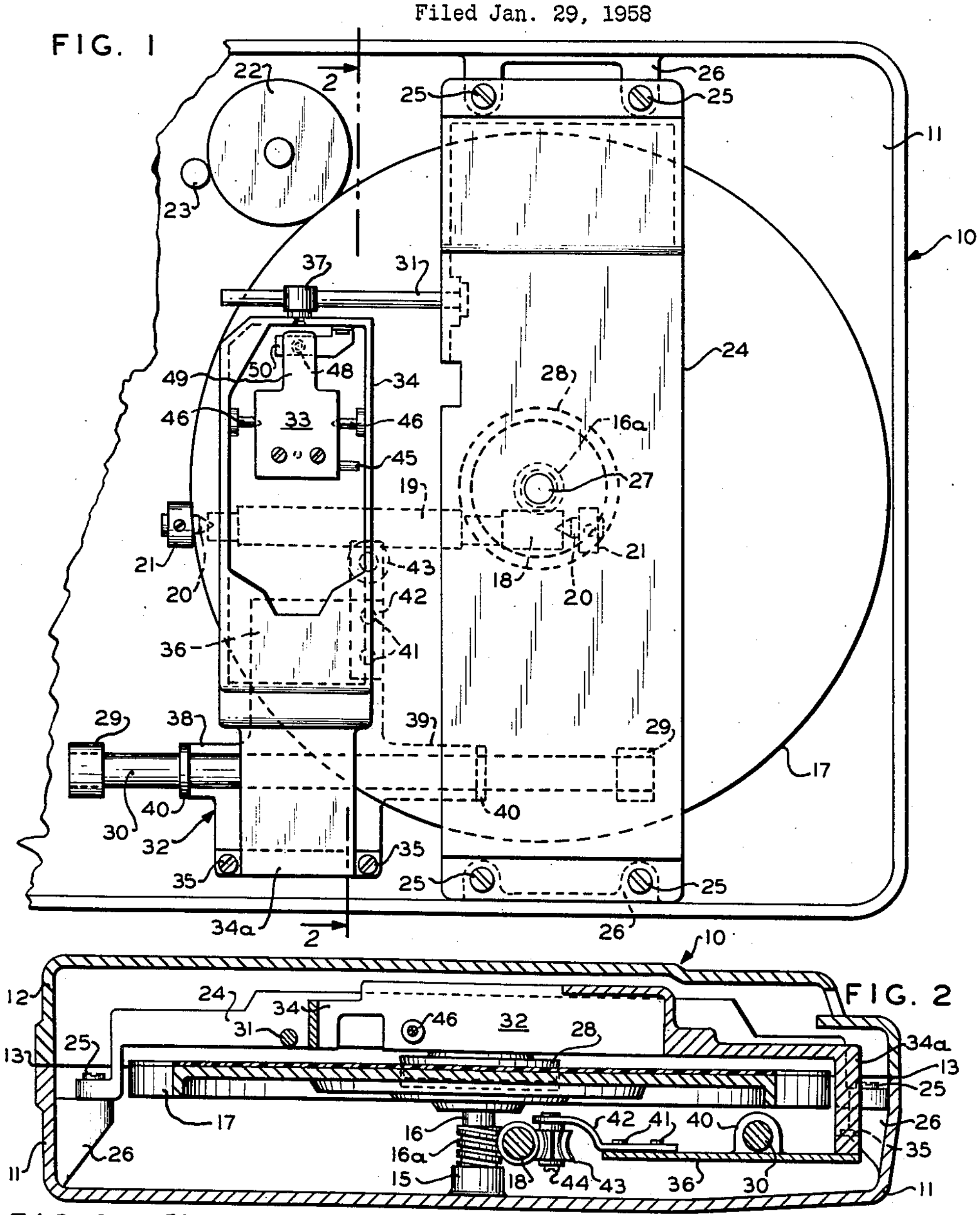
FIGURE 1 is a fractional top plan view of a recording machine for illustrating my invention.
FIGURE 2 is a fractional vertical sectional view taken substantially on the line 2—2 of FIGURE 1.

The recording machine fractionally shown in FIGURES 1 and 2 is a type of disc-record dictating machine described in the Dietz Patent No. 2,793,864, dated May 28, 1957, and to which reference may be had as to details of construction. This machine has a housing 10 comprising relatively flat lower and upper pan-like members 11 and 12 which are rectangular as viewed from the top and which meet on a horizontal plane at 13—13. The lower housing member, which serves also as a frame structure, has an upstanding circular boss 15 providing a bearing for a vertical shaft 16 of a turntable 17. The shaft is provided with a worm gear **16*a* which meshes with a worm wheel 18 on a transverse lead screw 19. This lead screw is supported by cone pivots 20 at its ends carried by standards 21 on the housing member 11. The turntable is rotated by a friction wheel 22 riding on the rim thereof, which wheel is in turn rotated by a drive shaft 23** driven by a suitable motor not shown.

Centrally over-lying the turntable from front to back is a bridge 24 having foot-like end portions secured by screws 25 onto internal ledges 26 of the lower housing member. In this bridge axially in line with the turntable is a bearing for a shaft 27 of a vertically reciprocable record clamp 28 adapted for securing a disc record onto the turntable. In the front portion of the lower housing member are two transversely spaced standards 29 which support a cross-rod 30, and staked to the left wall of the bridge 24 at the back portion of the housing is a second crossrod 31 parallel to the first crossrod. These crossrods carry slidably a carriage 32 for recording and reproducing heads of which however only a recording head 33 is herein shown. The carriage may be a casting comprising a hollow rectangular upper portion 34 open at the top and bottom and positioned above the turntable. This upper carriage portion is provided with a depending leg **34*a* at the front end which is secured by screws 35 to a bottom plate 36 positioned below the turntable. The upper portion 34 is provided with a rearwardly extending stud on which a roller 37 is journaled to ride on the back crossrod 31. The bottom plate 36 is provided with side arms 38 and 39 having upturned apertured lugs 40 which embrace the front crossrod 30. Thus, the carriage is free for transverse movement relative to the rotatable turntable 17** in directions transversely of the machine.

Secured at 41 to the bottom plate 36 is a rearwardly extending bracket 42 which carries a circular feed nut 43 that engages the lead screw. This feed nut is rotatably mounted on a vertical stud 44 but is frictionally restrained so that it will not turn responsive to the driving force applied thereto by the lead screw. The carriage is therefore driven at a slow progressive speed as the turntable is rotated to cause the recorder head to define a spiral track on the support record disc. However, the frictional restrain on the feed nut will yield to manual force applied to the carriage and permit the carriage to be shifted by hand. When the carriage is to be so manually moved, as well as when a record disc is to be mounted on or removed from the turntable, the recorder head is to be raised to a suitable level above the turnable as by any suitable lifting mechanism (not shown) operable on a lift finger 45 at the side of the recorder head.

The recorder head is supported on a transverse pivot axis by cone pivots 46 mounted in the side walls of the carriage portion 34. The recorder head has a stylus 47 at its forward end for engaging the record under influence of the weight of the head. In the present instance the head is a relatively heavy electro-magnetic structure requiring some relief of its weight bias—which is accomplished by means of a tension spring 48 connected between a tail piece 49 on the recorder head and a bracket 50 secured to the back wall of the upper carriage portion 34.

Figure 3:
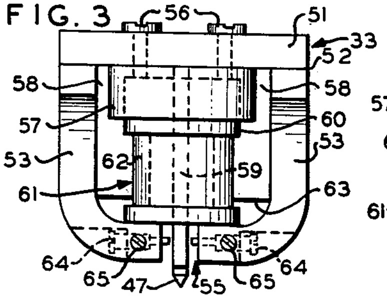
FIGURE 3 is an end elevational view to enlarged scale of the recording head of the above machine.
Figure 4:
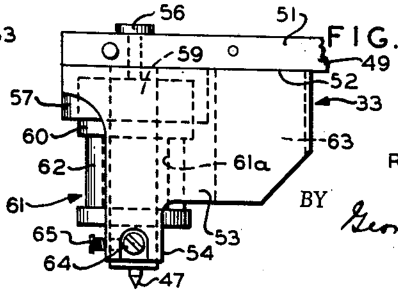
FIGURE 4 is a side elevation to enlarged scale of this recording head.

The recorder head itself, shown in detail in FIGURES 3 and 4, comprises a top non-magnetic plate 51 to which are joined at 52, as by brazing, two side plates 53 of ferro-magnetic material having a contour, for example, as shown in FIGURE 4. These side plates are provided with relatively narrow pole pieces 54 which are curved inwardly towards one another to form a narrow active air gap 55 between the confronting pole faces thereof. Secured by screws 56 to the underside of the forward portion of the top plate 51 is an inverted cup member 57 also of ferro-magnetic material. This cup member is short, however, of spanning the distance between these side plates as indicated by the gaps 58. Secured as by brazing to the central portion of the upper end wall of the cup is a depending reed-like armature 59 of ferro-magnetic material. This armature extends centrally through the active gap 55, and has the stylus 47 secured permanently to the lower end thereof. Received in the inverted cup 57 is a thick upper end wall 60 of a spool 61 as of plastic material, which surrounds the armature but whose axial opening *61a* is at a clearance spacing therefrom. Wound on this spool is a coil 62. Spanning the distance between the side walls to the rear of the spool 61 is a permanent bar magnet 63 as of "alnico" which is held in place as by clamping pressure of the side walls against the ends of the magnet and/or by suitable cementing.

The magnet 63 provides a constant field flux through the air gap 55. When an A.C. signal current is fed into the coil the net flux in the gap 55 at opposite sides of the armature is unbalanced to cause the armature to be deflected sidewise according to the current variations. During operation of the machine this causes the stylus to inscribe a laterally modulated groove in the record medium, which progresses on a spiral about the axis of the record. The pitch of this groove must be so set as to provide a substantial land area between successive groove convolutions, it being understood that the width of such land area between unmodulated grooves is the pitch less the groove width. Typically, the ratio of groove width to land width in dictating machines which operate by the embossing method is of the order of 2 to 1. This allows for an average overall modulation of the groove, i.e. plus and minus from a medial line, of about one-fourth the groove pitch. Because of the wide range in volume of different peoples voices as received by the microphone, measures must be taken such as by the use of AVC in the amplifier to restrict the range of groove modulation else the grooves would be cross-modulated into one another and the reproducer stylus would be unable to track the grooves. Even with the use of AVC in the amplifier, high level impact sounds can pass the amplifier without suppression in volume because of the time delay characterizing the action of such electrical suppression means with the result that there will occur momentarily overloading of the recorder head to cause momentary crossover of one groove convolution into the next and yet also steady loud level signals may cause such wide modulation of the groove that the modulations of one convolution come so close to those in the next as to give rise to the echo effects aforementioned when the record is played.

The foregoing difficulties have arisen because the prior volume limiting and suppression methods as heretofore employed have not been positive or instantaneously operative. By the present invention these deficiencies of the prior volume limiting methods are overcome by providing a definite mechanical limitation on the permissible amplitude of vibration of the recorder armature. In the present illustrative embodiment, this is accomplished by providing screws 64 having at least non-magnetic tips as of stainless steel or brass, which are threaded horizontally through the pole tips so that their non-magnetic tip portions extend past the pole faces into the air gap 55 at opposite sides of the armature as illustrated in FIGURE 3. The adjustment may be carried out, for example, by feeding an audio signal of say 1,000 c.p.s. from an oscillator into the recorder head, which signal has a level just short of where over-modulation would occur, and then turning the limiting screws inwardly until an audible chatter occurs. Thereupon the limiter screws 64 are secured in place by lock screws 65 threaded into the pole tips crosswise of the limiter screws.

By the positive limitation on the armature vibration which the limiter screws provide, it is impossible to ever so over-modulate the groove that it cannot be tracked by the reproducer stylus. Although by this mechanical limiting of the recorder response—which is like a clipper action in an electrical circuit—an amplitude and frequency distortion is introduced, the reproducer stylus does not respond to the high frequency distortion components with the result that an effective amplitude limitation is achieved which is remarkably free of any noticeable distortion. Moreover, it is found that with the positive limiting action which my invention provides, the ratio of groove width to land width can be increased to as much as 4 to 1. This means that the groove pitch can be reduced to achieve a much higher density of recordation on the record, or alternatively, the groove pitch can be left the same and the depth and width of the groove can be increased for better tracking if such should be desired.

The embodiment of my invention herein particularly shown and described is intended to be illustrative and not limitative of my invention since the same is subject to changes and modifications without departure from the scope of my invention, which I endeavor to express according to the following claims.

I claim:

1. A recording head comprising a permanent magnet, magnetizable pole tips connected to opposite poles of said magnet and having spaced confronting pole faces providing an active air gap therebetween; a magnetizable armature supported at one end and having a portion free to vibrate which extends centrally through said gap; a stylus mounted on the free end portion of said armature for engaging a record medium and inscribing signals thereon in accordance with the vibration of said armature; an activating coil surrounding a portion of said armature for driving the armature by electro-magnetic forces with a vibratory movement according to electrical signals fed to the coil; and rigid non-magnetic stop members on said pole tips extending beyond said pole faces toward said armature into the path of vibration of said armature for limiting vibration of said armature to a definite amplitude.

2. A recording head comprising a permanent magnet, magnetizable pole tips connected to said magnet and having spaced confronting pole faces providing an active air gap therebetween, a magnetizable, vibratile armature substantially rigidly supported at one end and having a portion free to vibrate at the other end extending centrally through said air gap; a record engageable stylus permanently secured to said free end of the armature; a coil around a central portion of said armature responsive to applied alternating electrical signals within a normal volume range for vibrating said armature by electro-magnetic forces with a normal range of amplitude of vibration; and rigid stop members mounted at predetermined clearance distances from opposite sides of said armature for limiting the vibration of said armature to said normal amplitude when signals of abnormally high level are fed to the recorder head.

3. In a recording machine: the combination of a revolvable support for a record medium; a recording head having a vibratile armature provided with a record engageable stylus; means for progressively advancing said head relative to the record medium in the directions of vibration of said stylus, as said record support is revolved, for causing the stylus to inscribe successive convolutions in the record medium having a pitch adapted to provide a given land area between successive groove convolutions; means for vibrating said armature laterally of said groove to provide sidewise modulations thereof according to the electrical signals fed to the recorder head; and rigid stop members at predetermined clearance distances from opposite sides of said armature for limiting the lateral vibratile movement of said stylus to a definite amplitude adapted to prevent modulation interference between successive groove convolutions.

4. In a recording machine: the combination of a revolvable support for a record medium; a recording head having a vibratile armature provided with a record-engageable stylus, and means for vibrating said armature according to electrical signals fed to the recording head; means operative as said record-support is revolved for providing a progressive relative advance of said head to the record medium whereby to cause the recording head to produce a convoluted groove of a given width and pitch in the record medium with a land area between successive groove convolutions and with the groove modulated sidewise according to said applied signals; and rigid bumpers at predetermined clearance distances from opposite sides of said armature for limiting the vibratile movement of said stylus to a definite amplitude less than the difference between said pitch and the width of said grooves.

References Cited in the file of this patent

UNITED STATES PATENTS

| | | |
|---|---|---|
| 1,473,707 | Lanter et al. | Nov. 13, 1923 |
| 1,823,162 | Pearson et al. | Sept. 15, 1931 |
| 1,944,258 | Mitchell | Jan. 23, 1934 |
| 1,974,895 | Round | Sept. 25, 1934 |
| 2,443,969 | Tyler | June 22, 1948 |
| 2,588,327 | Roberts et al. | Mar. 4, 1952 |
| 2,816,177 | Logan | Dec. 16, 1957 |

FOREIGN PATENTS

| | | |
|---|---|---|
| 285,454 | Great Britain | Feb. 21, 1929 |
| 370,265 | Great Britain | Apr. 7, 1932 |
| 379,843 | Great Britain | Sept. 8, 1932 |